(12) United States Patent
Sayama

(10) Patent No.: US 7,815,029 B2
(45) Date of Patent: Oct. 19, 2010

(54) ELECTROMAGNETIC CLUTCH APPARATUS

(75) Inventor: Masayuki Sayama, Tochigi (JP)

(73) Assignee: GKN Driveline Torque Technology KK, Tochigi-Ken (JP)

( * ) Notice: Subject to any disclaimer, the term of this patent is extended or adjusted under 35 U.S.C. 154(b) by 579 days.

(21) Appl. No.: 11/897,331

(22) Filed: Aug. 30, 2007

(65) Prior Publication Data

US 2008/0190726 A1    Aug. 14, 2008

(30) Foreign Application Priority Data

Aug. 31, 2006    (JP) .............................. 2006-236851

(51) Int. Cl.
*F16D 27/115*    (2006.01)
*F16D 27/14*    (2006.01)
*F16D 13/64*    (2006.01)

(52) U.S. Cl. ................ 192/84.91; 192/84.7; 192/107 R

(58) Field of Classification Search ............... 192/84.21
See application file for complete search history.

(56) References Cited

U.S. PATENT DOCUMENTS

| | | | | |
|---|---|---|---|---|
| 2,453,811 | A | * | 11/1948 | Pennington ............. 192/107 R |
| 4,305,198 | A | * | 12/1981 | Kanamaru et al. ...... 192/107 R |
| 4,685,202 | A | * | 8/1987 | Booth et al. ................... 29/607 |
| 5,870,818 | A | * | 2/1999 | Bisaga .......................... 29/607 |
| 6,454,156 | B1 | * | 9/2002 | Taras et al. ................. 29/889.1 |
| 7,004,297 | B2 | * | 2/2006 | Ando et al. ................. 192/84.7 |

FOREIGN PATENT DOCUMENTS

JP    2000-234634    8/2000

OTHER PUBLICATIONS esp@cenet patent abstract for Japanese Publication No. 2000234634, Publication date Aug. 29, 2000 (1 page).

* cited by examiner

*Primary Examiner*—Rodney H Bonck
(74) *Attorney, Agent, or Firm*—Osha Liang LLP

(57) ABSTRACT

In an electromagnetic clutch apparatus for forming a magnetic path in a circulating shape by an electromagnet at a pilot clutch alternately arranged with a main outer plate and a main inner plate and capable of controlling to transmit a torque between a clutch housing and a cam plate by being engaged in an axial direction and at a surrounding of a nonmagnetic portion continuously formed in the axial direction of a middle portion in a diameter direction of the pilot clutch to carry out an engaging, the nonmagnetic portion is formed by through holes in a circular arc shape having bridge portions for maintaining a shape in a diameter direction of the pilot clutch therebetween in a peripheral direction, and the bridge portion is divided in the diameter direction of the pilot clutch and a nonmagnetic member is interposed between divisions thereof.

15 Claims, 9 Drawing Sheets

ELECTROMAGNETIC CLUTCH APPARATUS

This application claims foreign priority from Japanese Patent Application No. 2006-236851 filed on Aug. 31, 2006, the entire contents of which are hereby incorporated by reference.

BACKGROUND OF THE INVENTION

1. Field of the Invention

The present invention relates to an electromagnetic clutch apparatus.

2. Related Art

Disclosed in JP-A-2000-234634 is an electromagnetic clutch apparatus of a background art applied to a torque transmitting coupling. According to the electromagnetic clutch apparatus, a pilot clutch is engaged by attracting an armature by forming a magnetic path in a circulating shape by an electromagnet. A main clutch is controlled to be engaged by the electromagnet by exerting a press force to the main clutch by engaging the pilot clutch.

The electromagnetic clutch apparatus is formed with a through hole in a circular arc shape at the pilot clutch for forming the magnetic path and includes a bridge portion for maintaining a shape in a diameter direction of the pilot clutch between the through holes.

However, by the through hole, the magnetic path in the circulating shape surrounding the through hole is shortcut and there is a loss in a magnetic force. Therefore, in order to increase an engaging force, the electromagnet or the pilot clutch is large-sized, and an energy loss is brought about by increasing a supply current.

SUMMARY OF THE INVENTION

One or more embodiments of the invention provide an electromagnetic clutch apparatus in which a problem that a shortcutting is brought about at a bridge portion and there is a loss in the magnetic force is resolved.

In accordance with one or more embodiments of the invention, an electromagnetic clutch apparatus is provided with: a multiplates clutch including an outer plate and an inner plate alternately arranged, and configured to control a torque transmission between rotating members by engaging the outer plate and the inner plate in an axial direction; and a nonmagnetic portion formed continuously along the axial direction and at a middle portion in a diameter direction of the multiplates clutch to form a magnetic path of an electromagnet at a surrounding of the nonmagnetic portion in a circulating shape, wherein the multiplates clutch is divided in the diameter direction into at least two parts, and a nonmagnetic member is interposed between the parts to form the nonmagnetic portion.

Further, the nonmagnetic portion may comprise a plurality of bridge portions provided at the middle portion in the diameter direction and a plurality of through holes provided between the bridge portions in a peripheral direction of the multiplates clutch, and the bridge portions may be constituted by the nonmagnetic member.

Further, the nonmagnetic member may be provided on at least one of the outer plate and the inner plate.

Further, one of the outer plate and the inner plate may be divided in a plate thickness direction and in a diameter direction into an outer diameter portion and an inner diameter portion, the outer diameter portion may include an outer diameter side piece, the inner diameter portion may include an inner diameter side piece, the outer diameter side piece and the inner diameter side piece may be opposed to each other in the axial direction, and the nonmagnetic member may be interposed between the outer diameter side piece and the inner diameter side piece to integrate the outer diameter portion and the inner diameter portion.

Further, the inner diameter side piece may be formed partially in the peripheral direction on an outer circumference of the inner diameter portion, and the outer diameter side piece may be formed partially in the peripheral direction on an inner circumference of the outer diameter portion.

Further, the inner diameter side piece may be formed throughout a whole circumference of an outer circumference of the inner diameter portion, and the outer diameter side piece may be formed throughout a whole circumference of an inner circumference of the outer diameter portion.

Further, at least one surface in the axial direction of one of the outer diameter side piece and the inner diameter side piece may be recessed from a sliding surface of the one of the outer plate and the inner plate.

Further, a notched portion may be provided on at least one of the outer diameter portion and the inner diameter portion, so that a space for restraining the outer plate and the inner plate from being stuck to each other by interposing air in the notched portion.

Further, the nonmagnetic member interposed between the parts may be coupled to the parts by a diffusion sintering coupling so to integrate the parts.

Moreover, in accordance with one or more embodiments of the invention, a clutch plate is provided with: an inner diameter portion; an outer diameter portion disposed on an outer diameter side of the inner diameter portion; and a nonmagnetic member interposed between the inner diameter portion and the outer diameter portion, wherein the inner diameter portion and the outer diameter portion are not directly contact with each other.

Further, the clutch plate may be divided in a plate thickness direction (an axial direction) and in a diameter direction at a middle portion in the diameter direction into the outer diameter portion and the inner diameter portion, the outer diameter portion may include an outer diameter side piece on an inner circumference of the outer diameter portion, the inner diameter portion may include an inner diameter side piece on an outer circumference of the inner diameter portion, the outer diameter side piece and the inner diameter side piece may be opposed to each other in an axial direction, and the nonmagnetic member may be interposed between the outer diameter side piece and the inner diameter side piece.

Further, the inner diameter side piece may be formed partially in a peripheral direction on the outer circumference of the inner diameter portion, and the outer diameter side piece may be formed partially in a peripheral direction on the inner circumference of the outer diameter portion.

Further, the inner diameter side piece may be formed throughout a whole circumference of the outer circumference of the inner diameter portion, and the outer diameter side piece may be formed throughout a whole circumference of the inner circumference of the outer diameter portion.

Further, at least one surface in the axial direction of one of the outer diameter side piece and the inner diameter side piece may be recessed from a sliding surface of the clutch plate.

Further, a notched portion may be provided on at least one of the outer diameter portion and the inner diameter portion.

Further, the nonmagnetic member may be coupled to the outer diameter portion and the inner diameter portion by a diffusion sintering coupling.

Further, the clutch plate may comprise coupling interfaces of diffusion sintering coupling provided between the nonmagnetic member and respective the inner diameter portion and the outer diameter portion.

According to the electromagnetic clutch apparatus of one or more embodiments of the invention, since the multiplates clutch is divided in the diameter direction into two parts, and the nonmagnetic member is interposed between the two parts to thereby form the nonmagnetic portion, the shortcut of the magnetic path can be restrained and the loss in the magnetic force can be restrained.

Moreover, according to the electromagnetic clutch apparatus of one or more embodiments of the invention, since the nonmagnetic portion is formed by the through holes each in the circular arc shape having the bridge portion for maintaining the shape in the diameter direction of the multiplates clutch therebetween in the peripheral direction and the nonmagnetic member is interposed, the magnetic path of the bridge portion is restrained from being shortcut and the loss in the magnetic force can be restrained.

Other aspects and advantages of the invention will be apparent from the following description and the appended claims.

DETAILED DESCRIPTION OF THE EXEMPLARY EMBODIMENTS

Embodiment 1

Torque Transmitting Coupling and Electromagnetic Clutch Apparatus

Figure 1:
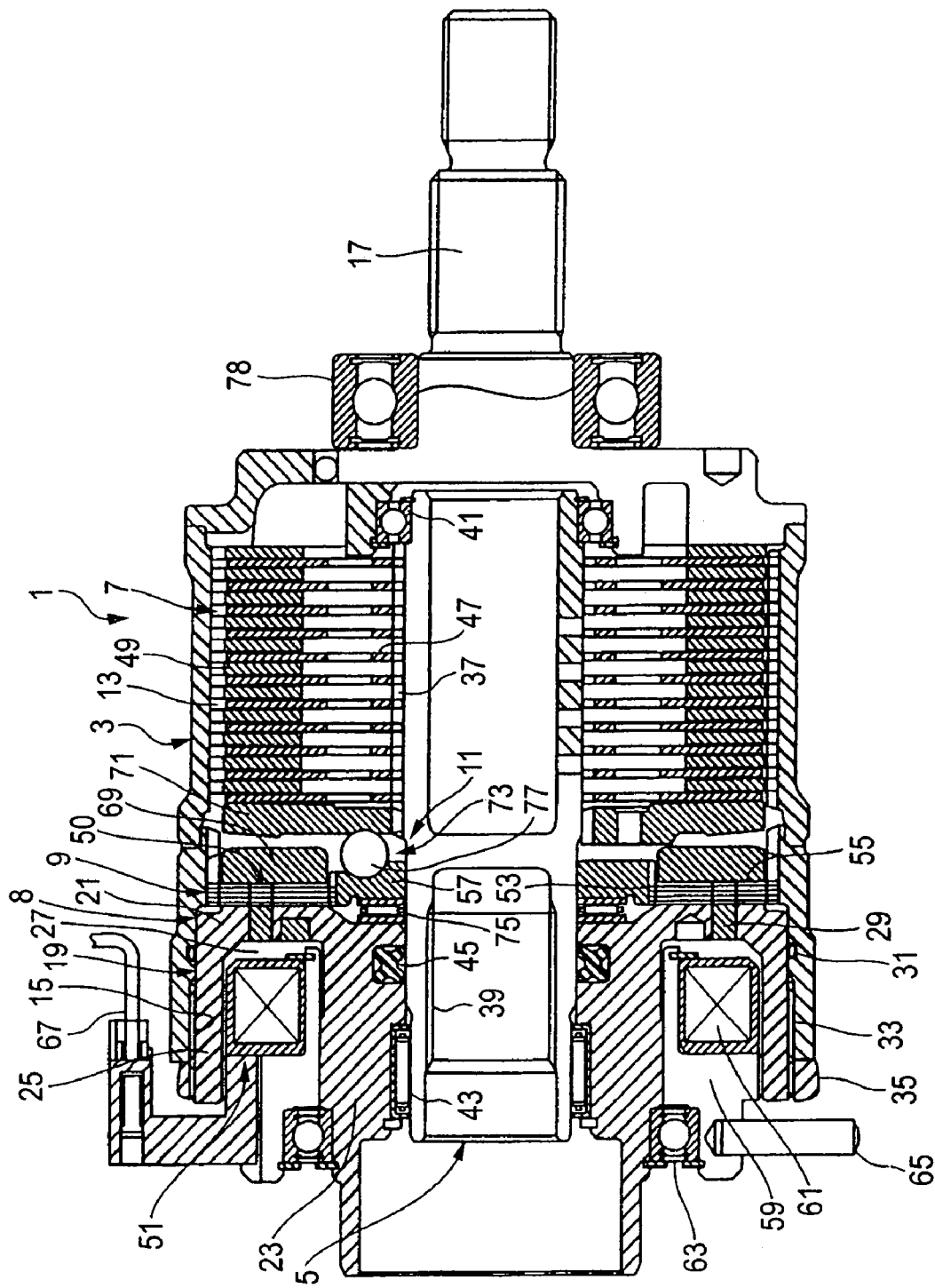
FIG. 1 is a sectional view of a torque transmitting coupling (Embodiment 1).

FIG. 1 is a sectional view of a torque transmitting coupling to which an electromagnetic clutch apparatus according to Embodiment 1 of the invention is applied. A torque transmitting coupling 1 is coupled between a propeller shaft and a drive pinion shaft of, for example, a four wheels drive vehicle.

The torque transmitting coupling 1 includes a housing 3 and a shaft 5, and includes a main clutch 7 and a pilot clutch 9 as a multiplates clutch constituting a portion of an electromagnetic clutch apparatus 8 and an engaging mechanism 11 between the clutch housing 3 and the shaft 5.

The clutch housing 3 is provided with an inner spline 13 for the main clutch 7 and the pilot clutch 9. An inner periphery of one end portion of the clutch housing 3 is formed with a female screw portion 15 and other end portion thereof is provided with an output shaft portion 17.

A rotor 19 constitutes a portion of the electromagnetic clutch apparatus 8 and is integrally formed with a rotor main body portion 21 in a shape of a vertical wall, a boss portion 23 formed on an inner peripheral side of the rotor main body portion 21, and an outer cylinder portion 25 formed on an outer peripheral side thereof. The rotor main body 21 is made of magnetic material. Between the boss portion 23 and the outer cylinder portion 25, a containing space portion 27 is provided on a back face side of the rotor main body portion 21. The boss portion is also made of magnetic material.

The rotor main body portion 21 is provided with a nonmagnetic portion 29. A seal 31 of an O-ring or the like supported by an inner peripheral face on a side of the clutch housing is brought into close contact with an outer peripheral side of the rotor main body portion 21 between the inner spline 13 and the female screw portion 15.

An outer peripheral face of an end portion of the outer cylinder portion 25 is provided with a male screw portion 33. The male screw portion 33 is screwed to the female screw portion 15 of the clutch housing 3 to thereby fix the rotor 19 to the clutch housing 3. A nut 35 is fastened to an end portion of the male screw portion 33 to thereby prevent the rotor 19 from being loosened relative to the clutch housing 3.

The shaft 5 is formed to be hollow. The shaft 5 is provided with a spline 37 and an inner spline 39. The shaft S is rotatably supported by the clutch housing 3 by a bearing 41, and rotatably supported by an inner periphery of the rotor 19 by a needle bearing 43. A seal 45 is brought into close contact with an outer peripheral face of the shaft 5. The seal 45 is supported by a side of the boss portion 23 of the rotor 19.

The main clutch 7 is interposed between the clutch housing 3 and the shaft 5 and adjusts a transmitting torque by exerting and releasing a press force. The main clutch 7 includes pluralities of sheets of main inner plates 47 and main outer plates 49 and the both plates 47, 49 are alternately arranged. The main inner plate 47 is brought into spline engagement with the spline 37 of the shaft 5. The main outer plate 49 is brought into spline engagement with the inner spline 13 of the clutch housing 3.

The pilot clutch 9 is provided with a nonmagnetic portion 50 continuously formed in an axial direction at a middle portion in a diameter direction, and forms a magnetic path in a circulating shape by an electromagnet 51 around the nonmagnetic portion 50 to thereby actuate the pilot clutch 9. An actuation of the pilot clutch 9 causes an actuation of the main clutch 7.

The pilot clutch 9 includes pluralities of sheets of pilot inner plates 53 (inner plates) and pilot outer plates 55 (outer plates) as clutch plates and the both plates 53, 55 are alternately arranged.

The pilot inner plate 53 is brought into a spline engagement with an outer periphery of a cam plate 57. The pilot outer plate 55 is brought into a spline engagement with the inner spline 13 of the clutch housing 3. The cam plate 57 constitutes a rotating member on an inner side relative to the clutch housing 3. The clutch housing 3 constitutes a rotating member on an outer side.

The electromagnet 51 constitutes a portion of the electromagnetic clutch apparatus 8 and is arranged in the containing space portion 27. The electromagnet 51 generates an electromagnetic force in accordance with a current control and supports a coil 61 by a support member 59. The support member 59 is supported by an outer periphery of the boss portion 23 of the rotor 19 relatively rotatably by way of a seal bearing 63. The support member 59 is engaged with a side of a differential carrier, not illustrated, by way of a pin 65 to be unable to be rotated. Further, the electromagnet 51 is electrically connected to a power source and a controller on a side of a vehicle body by way of a harness 67.

An armature 69 which is made of magnetic material is arranged to interpose the rotor main body portion 21 and the pilot clutch 9 between the armature 69 and the electromagnet 51. The armature 69 is brought into a spline engagement with the inner spline 13 of the clutch housing 3. The armature 69 is attracted by a magnetic force of the electromagnet 51, can be moved to the side of the rotor 19 to engage the pilot clutch 9, and constitutes a portion of the electromagnetic clutch apparatus 8.

The engaging mechanism 11 comprises the cam plate 57 and a press plate 71 and a ball cam 73 between the cam plate 57 and the press plate 71.

A back face side of the cam plate 57 is constituted to be brought into contact with a side of the rotor 19 by way of a needle bearing 75. A cam ball 77 is interposed between cam faces of the cam plate 57 and the press plate 71. The press plate 71 is brought into a spline engagement with the spine 37 of the shaft 5.

The torque transmitting coupling 1 having such a constitution is rotatably supported by a carrier side on a side of the output shaft portion 17 of the clutch housing 3 by way of a seal bearing 78 and is rotatably supported by a side of a carrier cover on the side of the rotor 19 by way of a bearing, not illustrated.

[Pilot Clutch]

Figure 2:
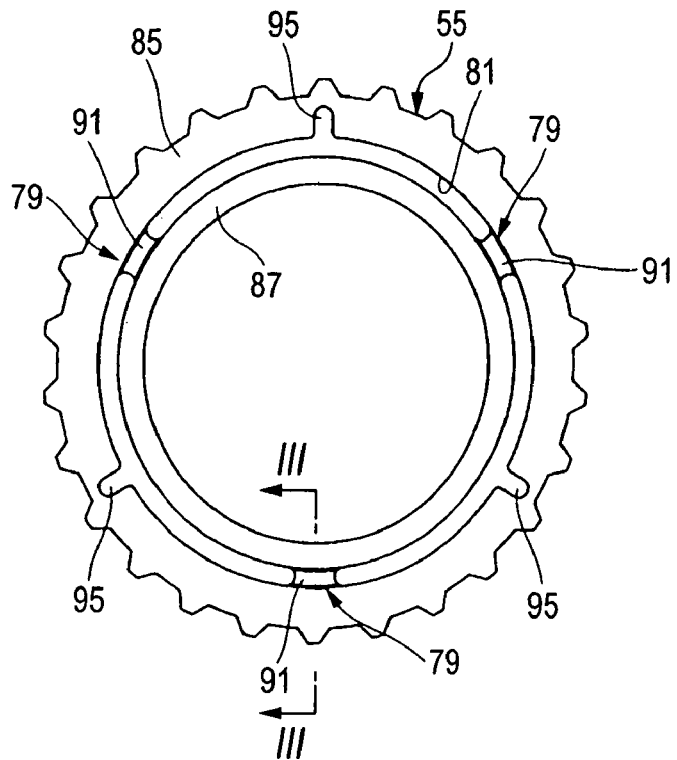
FIG. 2 is a front view of a pilot outer plate (Embodiment 1).
Figure 3:
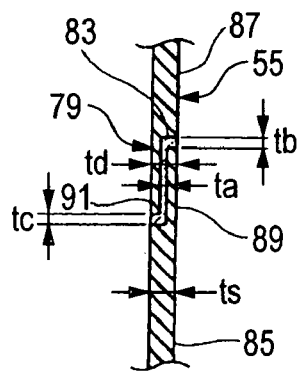
FIG. 3 is an enlarged sectional view taken along a line III-III of FIG. 2 (Embodiment 1).
Figure 4:
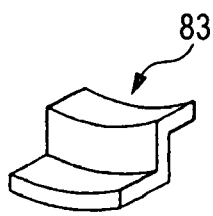
FIG. 4 is a perspective view of a nonmagnetic member (Embodiment 1).
Figure 5:
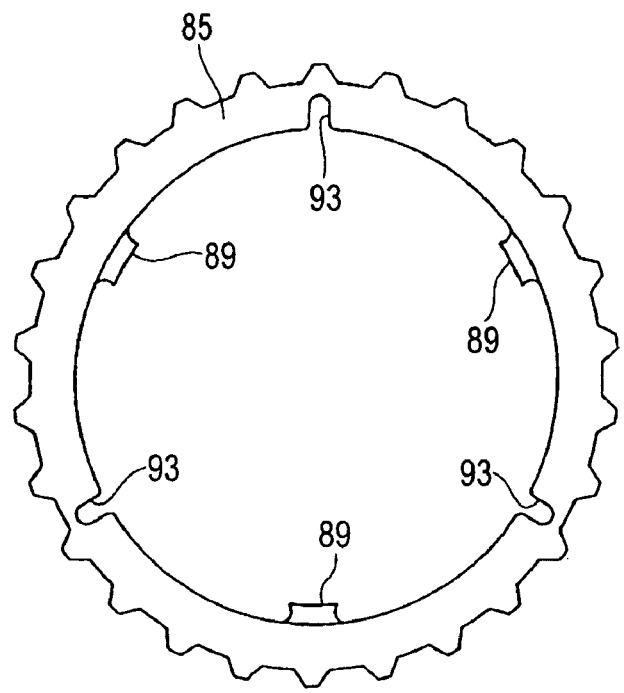
FIG. 5 is a front view of an outer diameter portion (Embodiment 1).
Figure 6:
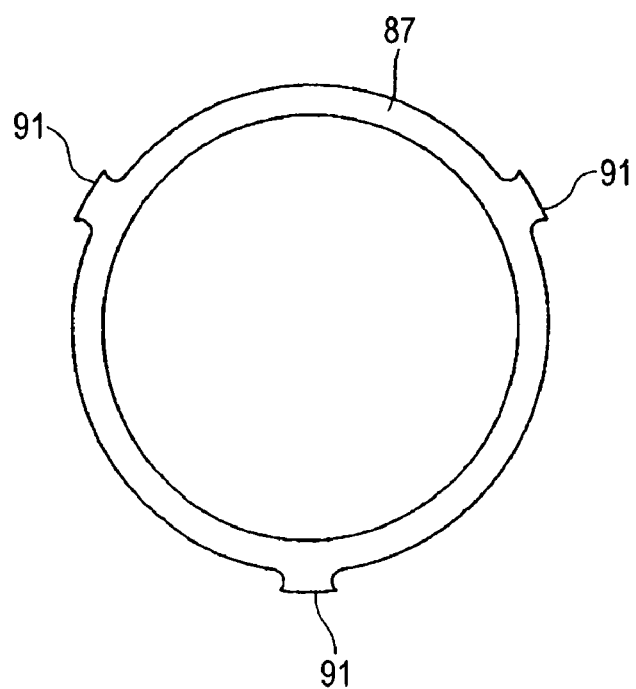
FIG. 6 is a front view of an inner diameter portion (Embodiment 1).

FIG. 2 through FIG. 6 relate to the pilot outer plate 55 of the pilot clutch 9, FIG. 2 is a front view, FIG. 3 is an enlarged sectional view taken along a line III-III of FIG. 2, FIG. 4 is a perspective view of a nonmagnetic member, FIG. 5 is a front view showing an outer diameter portion in a state of disassembling the pilot outer plate, FIG. 6 is a front view showing an inner diameter portion of the state of disassembling the pilot outer plate.

Further, although an explanation will be given here of the pilot outer plate 55 of the pilot clutch 9 constituting the multiplates clutch, a similar constitution is constructed also with regard to the pilot inner plate 53, and therefore, an explanation of the pilot inner plate 53 will be omitted.

The nonmagnetic portion 50 (FIG. 1) of the pilot clutch 9 is formed by a plurality of through holes 81 in an axial direction in a circular arc shape having bridge portions 79 for maintaining a shape in a diameter direction of the pilot outer plate 55 thereamong in a peripheral direction.

In the bridge portion 79, the pilot outer plate 55 is divided in a diameter direction of the pilot clutch 9 and a nonmagnetic member 83 is interposed in an interval by the division.

According to the embodiment, the pilot outer plate 55 includes an outer diameter portion 85 of FIG. 5 and an inner diameter portion 87 of FIG. 6 by being divided in a plate thickness direction and a diameter direction at the bridge portion 79. The outer diameter portion 85 and the inner diameter portion 87 are made of magnetic material. The outer diameter portion 85 is provided with an outer diameter side piece 89, the inner diameter portion 87 is provided with an inner diameter side piece 91. The outer diameter side piece 89 and the inner diameter side piece 91 are opposed to each other in an axial direction as shown by FIG. 2, FIG. 3. The outer diameter side piece 89 is provided with a notched portion 93 in a diameter direction. The notched portion 93 is for forming a space 95 for restraining the plates 53, 55 from being stuck to each other by interposing air at the pilot outer plate 55. The space 95 by the notched portion 93 may be formed for both or one of the pilot outer plate 55 and the pilot inner plate 53.

As shown by FIG. 4, three pieces of the nonmagnetic members 83 are formed by a chip-like shape in a crank shape at a section thereof, and interposed in the interval between the respective pieces 89, 91. The nonmagnetic members are made of nonmagnetic material such as copper, stainless-steel, and aluminum material. The nonmagnetic material may be formed to be a powder compact or a tentative sintered material into the chip-like shape.

In the pilot clutch 9 of the Embodiment 1, the outer diameter portion 85 and the inner diameter portion 87 and the nonmagnetic members 83 are coupled by diffusion sintering coupling. That is, the pilot outer plate 55 (and the pilot inner plate 53) is manufactured by assembling the outer diameter portion 85 and the inner diameter portion 87 and the nonmagnetic members 83 so that the nonmagnetic members 83 are interposed between the outer diameter side piece 89 and the inner diameter side piece 91. Then, an assembly of the outer diameter portion 85 and the inner diameter portion 87 and the nonmagnetic members 83 is pressurized from both sides of obverse and reverse sliding surface and heated, so that coupling interfaces of diffusion sintering coupling are formed between the outer diameter portion 85 and the nonmagnetic members 83 and between the inner diameter portion 87 and the nonmagnetic members 83.

In order to improve an adhesiveness of the coupling interfaces, manufacturing conditions are set to correspond to the shape so that heating temperature and pressure distribution in pressurizing and heating are controlled in each position of the coupling interfaces in the axial direction and in the diameter direction. Thus, by the diffusion sintering coupling, a clutch plate (the pilot outer plate 55 and the pilot inner plate 53) of electromagnetic clutch apparatus, which has a necessary dimension, a necessary strength for transmitting the torque, and a function of preventing a magnetic flux from leaking, can be obtained.

Accordingly, by manufacturing the clutch plate (the pilot outer plate 55 and the pilot inner plate 53) by the diffusion sintering coupling, it is possible to reduce a distortion of the dimension of the clutch plate caused by the coupling, compared to a coupling by spot welding. In addition, according to the diffusion sintering coupling, it is possible to strengthen the strength of the bonded portions, compared to a coupling by brazing. That is, by using the clutch plates manufactured by the diffusion sintering coupling as clutch plated of the multiplates clutch, it is possible to reduce an error in dimension accumulated by assembling a plurality clutch plates in the multiplates clutch, and it is also possible to obtain a necessary coupling strength at the nonmagnetic portion between the outer diameter portion and the inner diameter portion. As a result, according to the diffusion sintering coupling, it is possible to obtain the multiplates clutch which is small-sized, good in transmitting the torque, and reducing a deformation during engaging the multiplates clutch. Thus, by the diffusion sintering coupling, various advantages can be obtained.

Further, in the following Embodiments 2 to 4, the diffusion sintering coupling is also applicable for coupling the outer diameter portion and the inner diameter portion, and the advantages can also be obtained.

Further, as the diffusion sintering coupling, besides the abovementioned pressurization diffusion sintering coupling, another diffusion sintering coupling methods such as solid phase diffusion sintering coupling and liquid phase diffusion sintering coupling may be used.

Further, it is apparent that coupling methods other than the diffusion sintering coupling such as brazing, spot welding, and infiltration may be used for coupling the outer diameter portion and the inner diameter portion in the invention.

In states of FIGS. 2 and 3 constituting a coupling state, the nonmagnetic member 83 is interposed at an interval in the axial direction between the outer diameter side piece 89 and the inner diameter side piece 91, an interval in the diameter direction between the outer diameter side piece 89 and the inner diameter portion 87, and an interval in the diameter direction between the inner diameter piece 91 and the outer diameter portion 85.

A dimension ta in the axial direction of the nonmagnetic member 83, a dimension tb of the interval in the diameter direction between the outer diameter side piece 89 and the inner diameter portion 87, a dimension tc of the interval in the diameter direction between the inner diameter piece 91 and the outer diameter portion 85 are subjected to a dimension control to be able to achieve a minimum thickness capable of restraining a leakage of a magnetic flux. Particularly, the dimension ta is controlled along with a thickness of a bonding portion of the pilot inner plate 53 and the pilot outer plate 55, and a thickness dimension tb of the bonding portion is made to be within a thickness dimension ts of a sliding portion.

[Torque Transmission]

By controlling to conduct electricity to the electromagnet 51, a magnetic path in a circulating shape is formed among the rotor 19, the support member 59, the armature 69 and a surrounding of the nonmagnetic portion 50 of the pilot clutch 9. By forming the magnetic path, the armature 69 is attracted to the side of the rotor 19, and the pilot clutch 9 is engaged. By the engaging, the cam plate 57 is engaged with a side of the clutch housing 3 in a rotational direction.

On the other hand, the press plate 71 brought into the spline engagement with the side of the shaft 5 is rotated to displace relative to the cam plate 57 and the cam ball 77 rides on the cam plate 57. The ball cam 73 is operated by riding of the cam ball 77 on the cam face to generate a thrust and a reaction force to the side of the rotor 19 by way of the needle bearing 75 is generated.

The thrust is operated to the press plate 71, the press plate 71 operates the main clutch 7. The main clutch 7 transmits a torque from, for example, the clutch housing 3 to the shaft 5 in accordance with the engaging force.

When the control of conducting electricity to the electromagnet 51 is released, the pilot inner plate 53 and the pilot outer plate 55 of the pilot clutch 9 are slipped from each other, and the ball cam 73 is not operated. Therefore, there is not a movement by being pressed by the press plate 71, engagement of the main clutch 7 is released to bring about a free state.

Effect of Embodiment 1

According to Embodiment 1 of the invention, in the electromagnetic clutch apparatus 8 for executing the engaging by forming the magnetic path in the circulating shape by the electromagnet 51 at the pilot clutch 9 alternately arranged with the main outer plate 49 and the main inner plate 47 and capable of controlling to transmit a torque between the clutch housing 3 and the cam plate 57 by being engaged in the axial direction, and at the surrounding of the nonmagnetic portion 50 continuously formed in the axial direction at the middle portion in the diameter direction of the pilot clutch 9, the nonmagnetic portion 50 is formed by the through holes 81 in the circular arc shape having the bridge portions 79 for maintaining the shape of in the diameter direction of the pilot clutch 9 therebetween in the peripheral direction, the bridge portion 79 is divided in the diameter direction of the pilot clutch 9 and the nonmagnetic member 83 is interposed between the divisions, and therefore, the magnetic path is restrained from being shortcut at the bridge portion 79 and the loss of the magnetic force can be restrained.

Therefore, small-sized and the light-weighted formation of the pilot clutch 9 can be achieved by reducing a number of faces of the pilot clutch 9 by increasing the attraction force, and a reduction in a dragging torque can be achieved in cutting a current. Fuel cost can be improved by reducing the current supplied to the electromagnet 51. By restraining the loss of the magnetic force, the attraction force can be stabilized.

Even when the width in the diameter direction of the axial direction through hole 81 is made to be slenderer than that of the background art, a shortcut of the magnetic path can be made to be to the same degree or smaller than that of the background art, and an increase in a sliding face can be achieved, or the inner diameter can be increased or the outer diameter can be reduced without enlarging the pilot clutch 9.

The pilot outer plate 55 is provided with the notched portion 93 in the diameter direction at the outer diameter portion 85 in order to form a space for restraining the plates 53, 55 from being stuck to each other by interposing air, and therefore, the space 95 can easily be formed.

The outer diameter side piece 89 and the inner diameter side piece 91 and the nonmagnetic member 83 ensure contact areas to be opposed to each other in the axial direction, a strength capable of transmitting a desired friction torque between the pilot inner plate 53 and the pilot outer plate 55 can be achieved.

Embodiment 2

Figure 7:
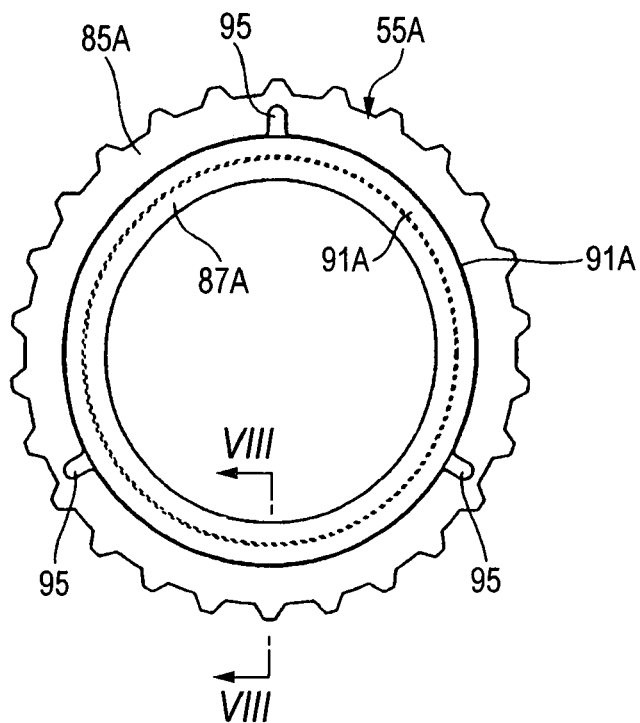
FIG. 7 is a front view of a pilot outer plate (Embodiment 2).
Figure 8:
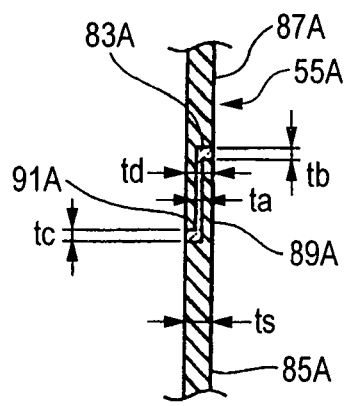
FIG. 8 is an enlarged sectional view taken along a line VIII-VIII of FIG. 7 (Embodiment 2).
Figure 9:
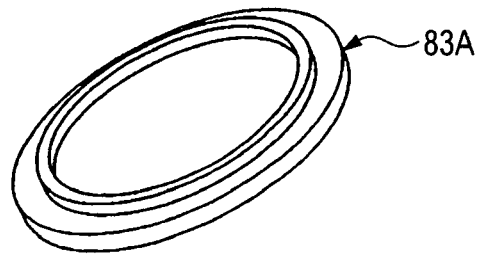
FIG. 9 is a perspective view of a nonmagnetic member (Embodiment 2).
Figure 10:
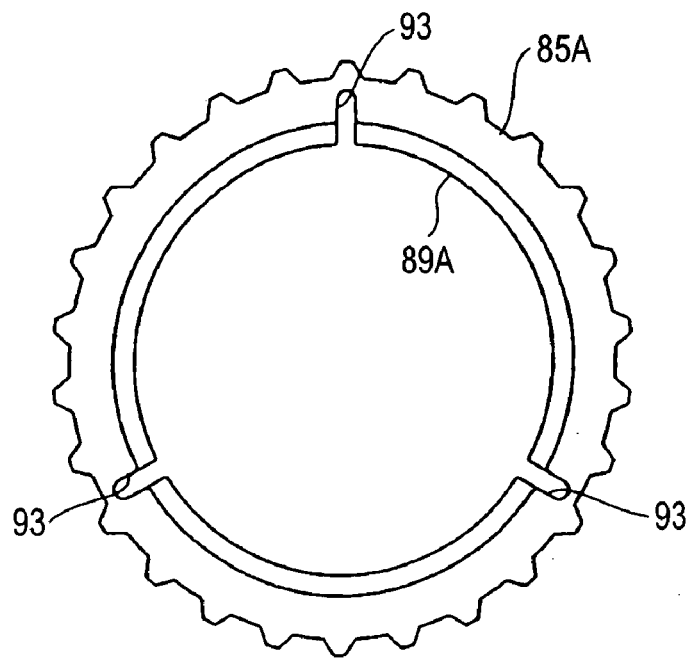
FIG. 10 is a front view of an outer diameter portion (Embodiment 2).
Figure 11:
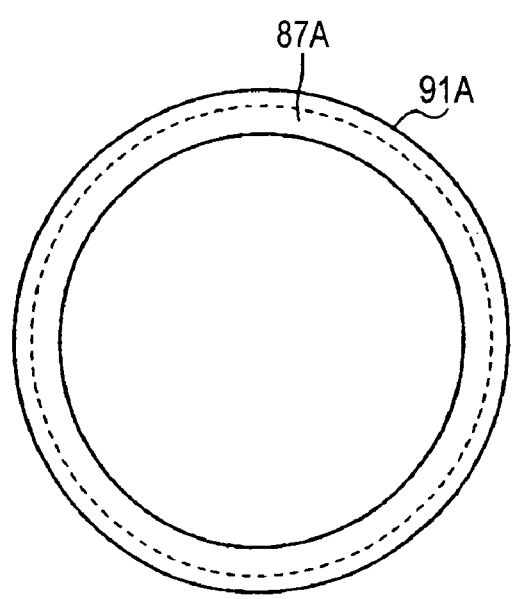
FIG. 11 is a front view of an inner diameter portion (Embodiment 2).

FIG. 7 through FIG. 11 relate to Embodiment 2 of the invention, FIG. 7 is a front view, FIG. 8 is an enlarged sectional view taken along a line VIII-VIII of FIG. 7, FIG. 9 is a perspective view of a nonmagnetic member, FIG. 10 is a front view showing an outer diameter portion in a state of disassembling a pilot outer plate, FIG. 11 is a front view showing an inner diameter portion of the state of disassembling the pilot outer plate. Further, a basic constitution thereof is similar to that of Embodiment 1, and an explanation will be given by attaching the same notations to the same or corresponding constitution portions or attaching A to the same notations.

According to the embodiment, a pilot outer plate 55A includes an outer diameter portion 85A divided in a plate thickness direction and a diameter direction at a middle portion in a diameter direction and having an outer diameter side piece 89A formed throughout a whole circumference of an inner circumference of the outer diameter portion 85A and an inner diameter portion 87A having an inner diameter side piece 91A formed throughout a whole circumference of an outer circumference of the inner diameter portion 91A. A nonmagnetic member 83A is formed in a ring-like shape and interposed in an interval between the outer diameter side piece 89A and inner diameter side piece 91A.

A relationship among dimensions ta, tb, tc, td, ts explained in Embodiment 1 is similarly set also in the embodiment.

Therefore, also in Embodiment 2, an effect similar to that of Embodiment 1 can be achieved. Further, according to Embodiment 2, the outer diameter side piece 89A and the inner diameter side piece 91A are formed in a circulating shape, the nonmagnetic member 83A is constituted by the ring-like shape, and therefore, an increase in the strength of the pilot clutch 9 is achieved and a transmittable friction torque can further be increased.

Embodiment 3

Figure 12:
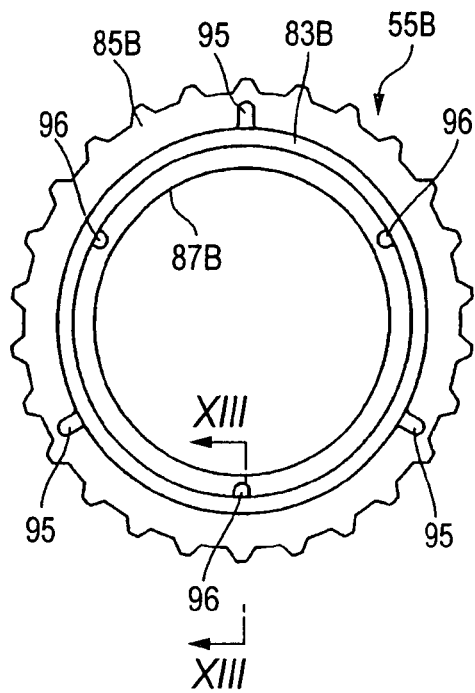
FIG. 12 is a front view of a pilot outer plate (Embodiment 3).
Figure 13:
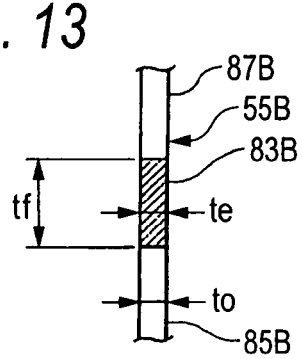
FIG. 13 is an enlarged sectional view taken along a line XIII-XIII of FIG. 12 (Embodiment 3).
Figure 14:
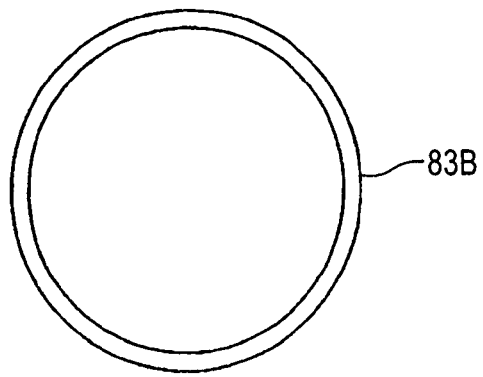
FIG. 14 is a front view of a nonmagnetic member (Embodiment 3).
Figure 15:
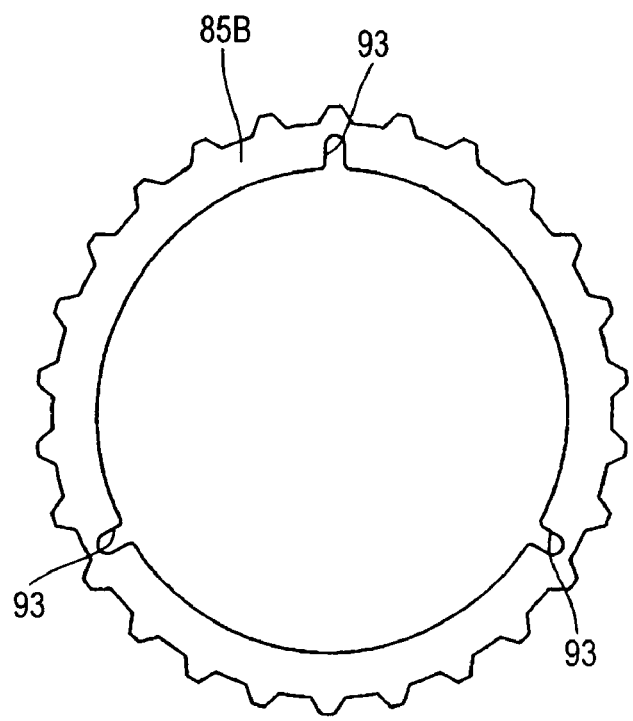
FIG. 15 is a front view of an outer diameter portion (Embodiment 3).
Figure 16:
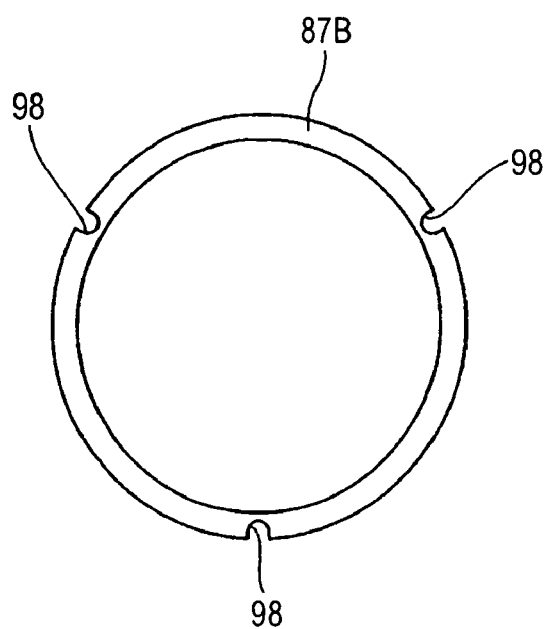
FIG. 16 is a front view of an inner diameter portion (Embodiment 3).

FIG. 12 through FIG. 16 relate to Embodiment 3 of the invention, FIG. 12 is a front view, FIG. 13 is an enlarged sectional view taken along a line XIII-XIII of FIG. 12, FIG. 14 is a front view of a nonmagnetic member, FIG. 15 is a front view showing an outer diameter portion in a state of disassembling a pilot outer plate, FIG. 16 is a front view showing an inner diameter portion in the state of disassembling the pilot outer plate. Further, a basic constitution thereof is similar to that of Embodiment 1, and an explanation will be given by attaching the same notations to the same or corresponding constitution portions or attaching B to the same notations.

According to Embodiment 3, a pilot outer plate 55B is divided at a middle portion in the diameter direction and a nonmagnetic member 83B is arranged between an outer diameter portion 85B and an inner diameter portion 87B in an interval between the outer diameter portion 85B and the inner diameter portion 87B. The nonmagnetic member 83B is constituted by a ring-like shape. According to Embodiment 3, the inner diameter portion 87B is also provided with a notched portion 98 in a diameter direction for forming a space 96 (FIG. 12).

A thickness direction te in an axial direction of the nonmagnetic member 83B is subjected to a dimension control to be able to achieve a minimum thickness of capable of restraining leakage in a magnetic flux. Further, the dimension te is controlled to be within a bonded portion thickness dimension to.

Although a dimension tf between inner and outer diameters of the nonmagnetic member 83B is set to be equal to or larger than a minimum dimension capable of restraining the leakage in the magnetic flux, the dimension can be made to be smaller than the dimension of the bridge portion of the background art.

Therefore, also in Embodiment 3, an effect similar to that of Embodiment 1 can be achieved. Further, according to Embodiment 3, a bridge portion is not formed, and therefore, fabrication thereof is easy.

Further, when a portion of the nonmagnetic member in the ring-like shape is formed to project to inside of the space 95 or the space 96 formed by the notched portion 93 formed at the outer diameter portion 85B or the notched portion 98 formed at the inner diameter portion 87B, a face in a rotational direction of the projected portion is brought into contact with a face in the rotational direction of the notched portion 93 or the notched portion 98 to bear a portion of a rotational torque, and therefore, bonding forces of the inner and outer peripheral faces of the nonmagnetic member 83B can be assisted.

Embodiment 4

Figure 17:
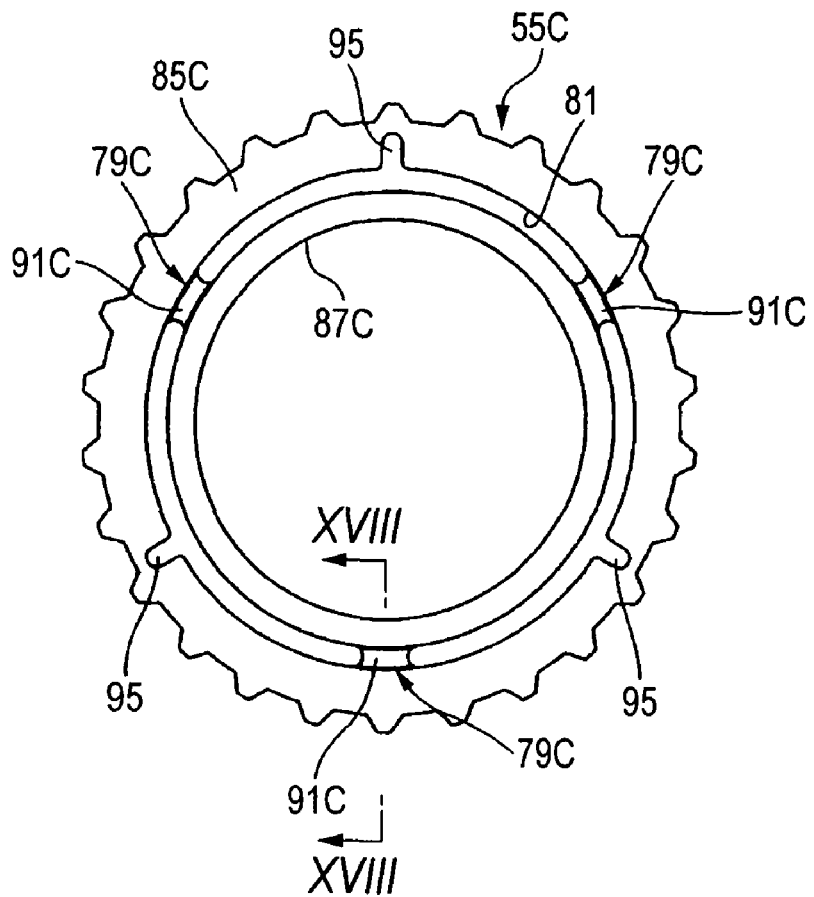
FIG. 17 is a front view of a pilot outer plate (Embodiment 4).
Figure 18:
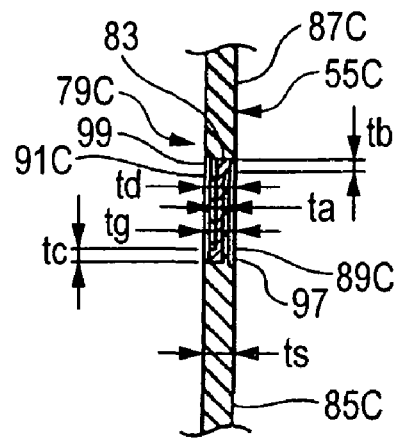
FIG. 18 is an enlarged sectional view taken along a line XVIII-XVIII of FIG. 17 (Embodiment 17).
Figure 19:
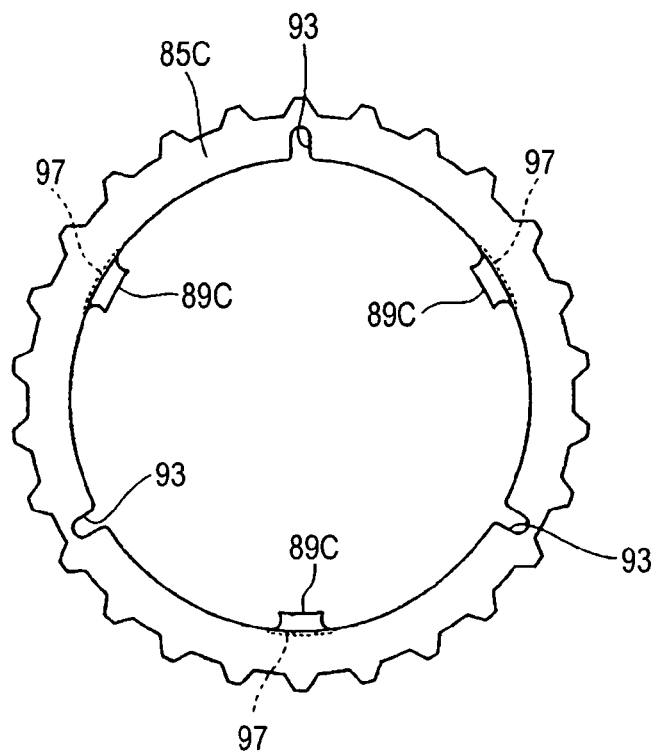
FIG. 19 is a front view of an outer diameter portion (Embodiment 4).
Figure 20:
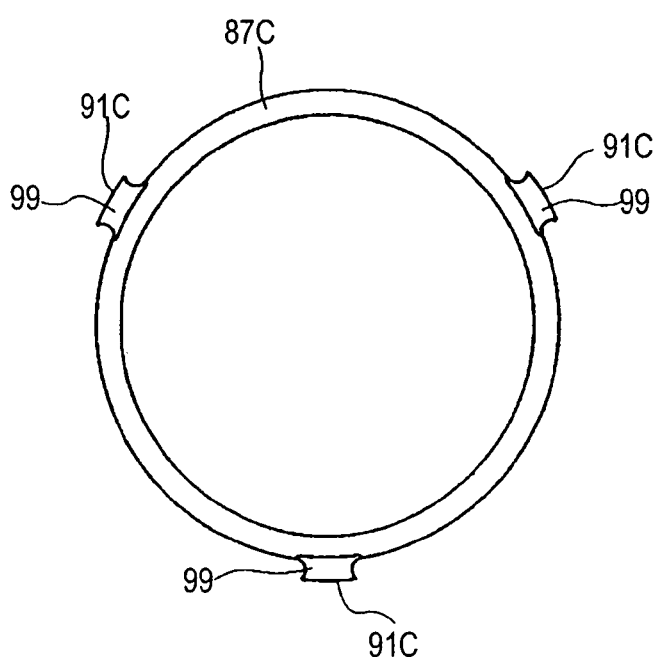
FIG. 20 is a front view of an inner diameter portion (Embodiment 4).

FIG. 17 through FIG. 20 relate to Embodiment 4 of the invention, FIG. 17 is a front view, FIG. 18 is an enlarged sectional view taken along a line XVIII-XVIII of FIG. 17, FIG. 19 is a front view showing an outer diameter portion in a state of disassembling a pilot outer plate, FIG. 20 is a front view showing an inner diameter portion of the state of disassembling the pilot outer plate. Further, a basic constitution thereof is similar to that of Embodiment 1, and an explanation will be given by attaching the same notations to the same or corresponding constitution portions or attaching C to the notations.

According to Embodiment 4, recesses 97, 99 for restraining a sliding friction are provided at surfaces of an outer diameter side piece 89C and an inner diameter side piece 91C of a pilot outer plate 55C.

The relationship among the dimensions ta, tb, tc, td, ts explained in Embodiment 1 is similarly set also in Embodiment 4. However, a thickness direction tg between the outer diameter side piece 89C and the inner diameter side piece 91C is set to be smaller than the thickness dimension td of the bonding portion of Embodiment 1.

Therefore, also in Embodiment 4, an effect similar to that of Embodiment 1 can be achieved. Further, according to Embodiment 4, the recesses 97, 99 are provided, and therefore, in friction sliding of the pilot clutch 9, contact of the bonding portion can be restrained, the sliding resistance can be restrained, and a sliding characteristic can be stabilized.

<Others>

The nonmagnetic member can also be interposed only either one of the pilot outer plate and the pilot inner plate of the pilot clutch.

Further, small oil grooves may be formed at friction faces of the pilot outer plate and the pilot inner plate.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

DESCRIPTION OF REFERENCE NUMERALS AND SIGNS

3 clutch housing (rotating member)
8 electromagnetic clutch apparatus
9 pilot clutch (multiplates clutch)
50 nonmagnetic portion
53 pilot inner plate (inner plate)
55, 55A, 55B, 55C pilot outer plates (outer plates)
57 cam plate (rotating member)
79, 79A, 79C bridge portions
81 axial direction through hole
83, 83A, 83B nonmagnetic members
85, 85A, 85B, 85C outer diameter portions
87, 87A, 87B, 87C inner diameter portions 89, 89A, 89C outer diameter side pieces
91, 91A, 91C inner diameter side pieces
93, 98 notched portions
95, 96 spaces
97, 99 recesses

What is claimed is:

1. An electromagnetic clutch apparatus comprising:
a multiplates clutch including an outer plate and an inner plate alternately arranged, and configured to control a torque transmission between rotating members by engaging the outer plate and the inner plate in an axial direction; and
a nonmagnetic portion formed continuously along the axial direction and at a middle portion in a diameter direction of the multiplates clutch to form a magnetic path of an electromagnet surrounding the nonmagnetic portion in a circulating shape,
wherein the multiplates clutch is divided in the diameter direction into at least two parts,
wherein a nonmagnetic member is interposed between the parts to form the nonmagnetic portion, and
wherein one of the outer plate and the inner plate is divided in a plate thickness direction and in a diameter direction into an outer diameter portion and an inner diameter portion, the outer diameter portion includes an outer diameter side piece, and the inner diameter portion includes an inner diameter side piece, the outer diameter side piece and the inner diameter side piece are opposed to each other in the axial direction, and the nonmagnetic member is interposed between the outer diameter side piece and the inner diameter side piece to integrate the outer diameter portion and the inner diameter portion.

2. The electromagnetic clutch apparatus according to claim 1, wherein the nonmagnetic portion comprises a plurality of bridge portions provided at the middle portion in the diameter direction and a plurality of through holes provided between the bridge portions in a peripheral direction of the multiplates clutch, and the bridge portions are constituted by the nonmagnetic member.

3. The electromagnetic clutch apparatus according to claim 1, wherein the nonmagnetic member is provided on at least one of the outer plate and the inner plate.

4. The electromagnetic clutch apparatus according to claim 1, wherein the inner diameter side piece is formed partially in the peripheral direction on an outer circumference of the inner diameter portion, and the outer diameter side piece is formed partially in the peripheral direction on an inner circumference of the outer diameter portion.

5. The electromagnetic clutch apparatus according to claim 1, wherein the inner diameter side piece is formed throughout a whole circumference of an outer circumference of the inner diameter portion, and the outer diameter side piece is formed throughout a whole circumference of an inner circumference of the outer diameter portion.

6. The electromagnetic clutch apparatus according to claim 1, wherein at least one surface in the axial direction of one of the outer diameter side piece and the inner diameter side piece is recessed from a sliding surface of the one of the outer plate and the inner plate.

7. The electromagnetic clutch apparatus according to claim 1, wherein a notched portion is provided on at least one of the outer diameter portion and the inner diameter portion, so that a space for restraining the outer plate and the inner plate from being stuck to each other by interposing air in the notched portion.

8. The electromagnetic clutch apparatus according to claim 1, wherein the nonmagnetic member interposed between the parts are coupled to the parts by a diffusion sintering coupling so to integrate the parts.

9. A clutch plate comprising:
an inner diameter portion;
an outer diameter portion disposed on an outer diameter side of the inner diameter portion; and
a nonmagnetic member interposed between the inner diameter portion and the outer diameter portion,
wherein the inner diameter portion and the outer diameter portion are not directly in contact with each other, and
wherein the clutch plate is divided in a plate thickness direction and in a diameter direction at a middle portion in the diameter direction into the outer diameter portion and the inner diameter portion, the outer diameter portion includes an outer diameter side piece on an inner circumference of the outer diameter portion, and the inner diameter portion includes an inner diameter side piece on an outer circumference of the inner diameter portion, the outer diameter side piece and the inner diameter side piece are opposed to each other in an axial direction, and the nonmagnetic member is interposed between the outer diameter side piece and the inner diameter side piece.

10. The clutch plate according to claim 9, wherein the inner diameter side piece is formed partially in a peripheral direction on the outer circumference of the inner diameter portion, and the outer diameter side piece is formed partially in a peripheral direction on the inner circumference of the outer diameter portion.

11. The clutch plate according to claim 9, wherein the inner diameter side piece is formed throughout a whole circumference of the outer circumference of the inner diameter portion, and the outer diameter side piece is formed throughout a whole circumference of the inner circumference of the outer diameter portion.

12. The clutch plate according to claim 9, wherein at least one surface in the axial direction of one of the outer diameter side piece and the inner diameter side piece is recessed from a sliding surface of the clutch plate.

13. The clutch plate according to claim 9, wherein a notched portion is provided on at least one of the outer diameter portion and the inner diameter portion.

14. The clutch plate according to claim 9, wherein the nonmagnetic member are coupled to the outer diameter portion and the inner diameter portion by a diffusion sintering coupling.

15. The clutch plate according to claim 9, wherein the nonmagnetic member and the inner diameter portion are coupled via diffusion sintering, and the nonmagnetic member and the outer diameter portion are coupled via diffusion sintering.

* * * * *